June 5, 1928.

C. G. RICHARDSON

1,672,780

MULTIPLE CLOTH SHEARS

Filed May 17, 1924    5 Sheets-Sheet 2

Inventor:
C. G. Richardson
by Geo. N. Goddard, atty.

June 5, 1928.

C. G. RICHARDSON

1,672,780

MULTIPLE CLOTH SHEARS

Filed May 17, 1924

Patented June 5, 1928.

1,672,780

UNITED STATES PATENT OFFICE.

CHARLES G. RICHARDSON, OF SPRINGFIELD, VERMONT, ASSIGNOR TO PARKS & WOOLSON MACHINE COMPANY, OF SPRINGFIELD, VERMONT, A CORPORATION OF VERMONT.

MULTIPLE CLOTH SHEARS.

Application filed May 17, 1924. Serial No. 713,945.

This invention relates to multiple cloth shears, and in its present form is shown applied to a shear of this type constructed and arranged to be built up out of separate sections that may be coupled together, one after the other, so that, starting with a single shear, it is possible to build up a multiple shear having as many shearing blades and the necessary cooperating elements as it may be desired to use.

In many cases mills, equipped with single or double shears, find it advantageous to employ shears having a larger number of shear blades but are prevented by the large expense involved in the purchase of a multiple shear from using such shears in their mills.

The present invention meets this difficulty by providing individual shear sections that can be added on to a single shear, one after the other, so as to convert a shear into a multiple shear having any desired number of fly blades or shearing devices with the appropriate co-acting parts.

The building of a shear having four or five blades however presents a number of practical difficulties with which the present invention is concerned.

While the raising of a single fly blade or shear away from the cloth by hand on each circuit that the cloth makes through the machine is not a laborious or burdensome task for the operator, yet in a multiple shear having four or five or even more fly blades which have to be raised each time that the seam ends of the cloth being sheared approach the respective fly blades, it entails a great deal of manual labor upon the operator. To meet this difficulty I have provided blade-raising mechanism which, while still under the manual control of the operator, performs the heavy work of raising the blade whenever he desires so to do. Furthermore, since the considerable depth of the multiple shear, from the front, which is the operator's position, to the back end, makes it difficult for the operator to inspect the short stretch of cloth approaching each shearing line, I have so constructed and arranged different parts of the shear as to overcome this difficulty by arranging the mechanism so that the travel of the cloth, in front of the rearmost fly blades, is disposed at upward angles making the whole exposed stretch of the cloth, at the rear of the machine in front of each fly blade, clearly visible for inspection by the operator.

As the operator must always be able to adjust or control the extent of movement of the rotary fly blades toward their respective cloth rests, I have provided means within easy reach of the operator, at the front of the machine, by which he is able to instantly adjust the stop rest against which the swinging fly blade bears, when in operative position, so as to control at all times the height or distance of the shear blades from the edge of the cloth rest where the shearing takes place and, as the distance separating the operator from the rearward blades is too great to allow him to determine properly just what this separating space is, I have provided a series of horizontal dials, easily readable from the front of the machine, and so connected with the adjustable stop as to be free from backlash, whereby the operator can tell with certainty and precision the exact distance of each fly blade from its opposed cloth rest.

The multiplicity of brush shafts, cloth feed-roll shafts, fly blade shafts etc., used in such a multiple shear presents a serious problem of transmission of power without substantial losses through deterioration and stretching of belts, belt slippage, undue prolongation of shaft ends to carry pulleys arranged to prevent mutual interference of the driving belts, and other troubles as well. To meet these conditions I have devised a new system of belting drive or transmission by which the various brushes of each shear section are driven by a single individual belt from its own drive pulley so that short belts may be used with a consequent minimum of stretch and wear, while at the same time avoiding a multiplicity of belts difficult to arrange, without mutual interference and without undue extension of some of the shafts. Provision is also made for positive or nonslipping drive connection between the cloth feed-roll shafts so as to secure the same rate of feed for the cloth throughout all shear sections by the use of interconnected chain drives for such feed rolls, all of which travel at a uniform rate.

These and other features of the invention will be particularly described in the following specification and will be defined in the claims hereto annexed.

In the accompanying drawings I have illustrated a construction and arrangement of multiple shear embodying the features of invention herein set forth and illustrative of the principles underlying the same, in which:

Figure 1$^a$ is a similar view showing the rear end of such shear, the dividing line between the front and rear portions of the complete shear being indicated by a vertical line at the left since this figure forms a continuation of Figure 1 to complete the entire elevation of the machine.

The form of multiple shear shown in the accompanying drawings is made in five sections $a$, $b$, $c$, $d$ and $e$, which designations are applied to the frame work of each section which are assembled together to make the complete quintuple shear, but it will be understood that any number of sections can be assembled together according to the principles of construction and arrangement herein described.

Figure 1:
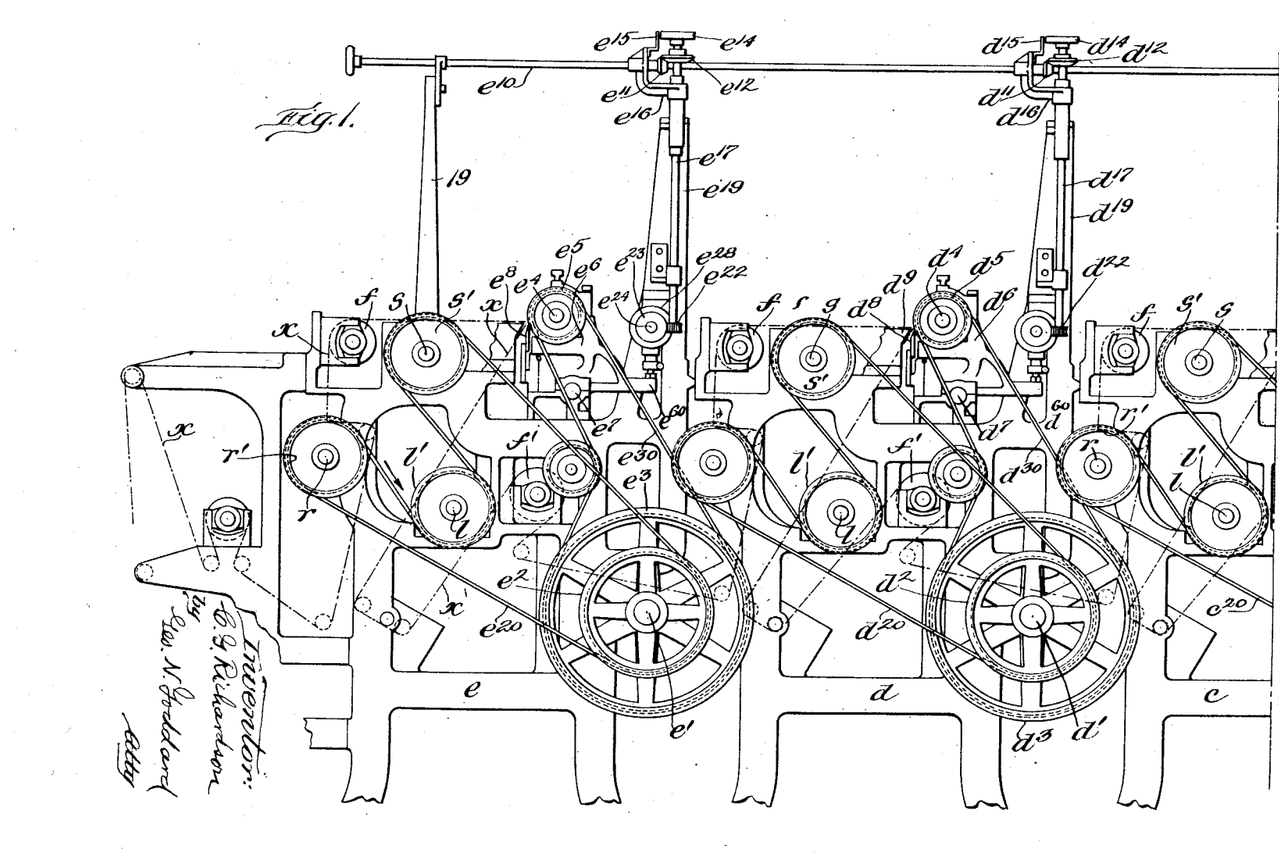
Figure 1 is a side elevation showing the front end of a multiple shear.
Figure 1A:
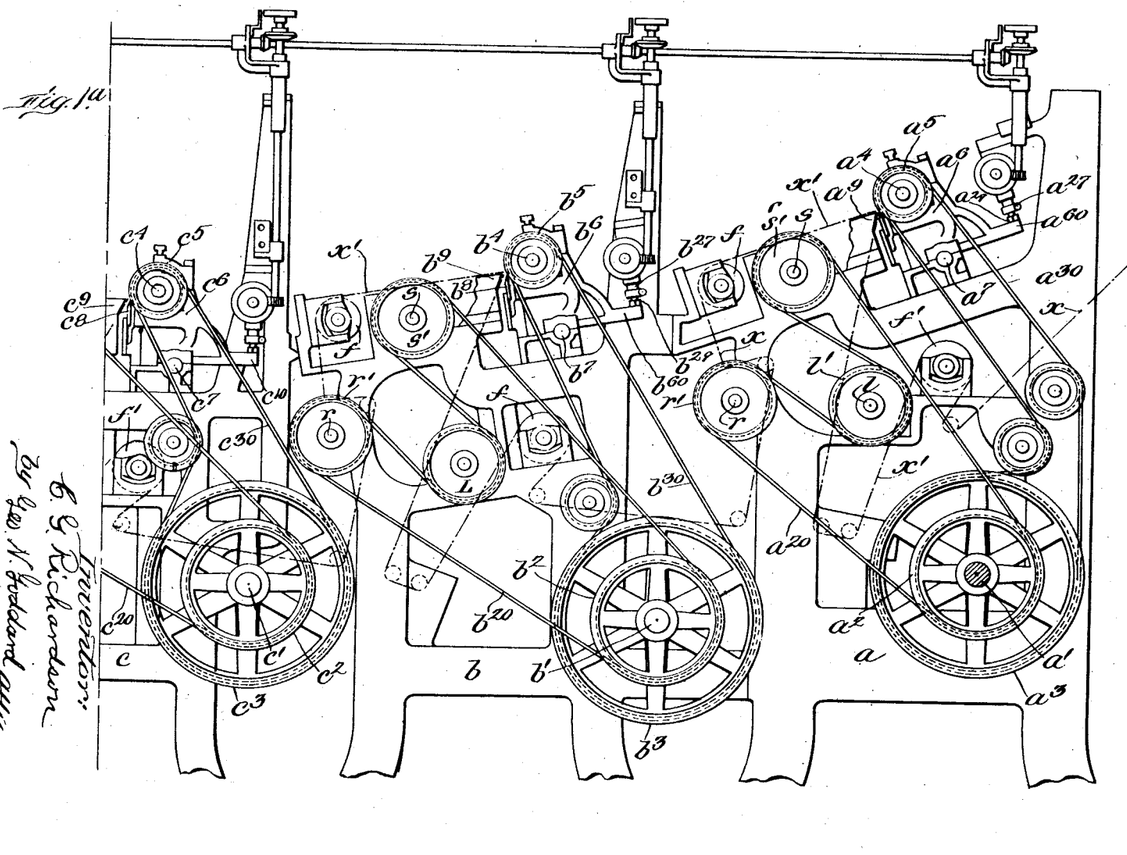

It will be convenient to notice that the course or path of the cloth being sheared, through the different parts of the machine, is indicated by dotted line marked $x$ in sections $c$, $d$ and $e$ and $x'$ in sections $a$ and $b$. In practice several lengths of cloth may be stitched together at their ends to form temporarily an endless belt so that the cloth may be fed continuously through the machine by the appropriate feed rolls without the necessity of having to introduce another end of cloth each time that a piece is run through the machine. On each complete circuit of the stitched pieces of cloth it will be obvious that the nap is sheared five times, that is to say, as many times as there are fly blades or shears used in the machine. The power is applied to the main shaft $a'$ which forms the driving shaft of the machine and, as shown, is located in the rear section $a$, as viewed in Figure 1$^a$. Each individual section is provided with its own driving shaft, as indicated at $a'$, $b'$, $c'$, $d'$ and $e'$, and may be interconnected by suitable driving belts usually arranged on the farther side of the machine from that shown in Figures 1 and 1$^a$.

On each of the individual drive shafts are secured transmission pulleys $a^2$, $b^2$, $c^2$, $d^2$, $e^2$ for transmitting the proper rotation to the different brush shafts mounted in each section. Thus in section $a$ transmission belt $a^{20}$ passes around pulley $r'$ on the shaft $r$ of the raising brush and reversely around pulley $l'$ on the laying brush shaft $l$, which acts on two adjacent stretches of the nap side of the cloth to smooth or lay down the nap after that portion of the cloth comes from the shear or fly blade. This transmission belt also passes around driving pulley $s'$ on the beater brush shaft $s$ so that all three brushes, namely, the raising brush, the beater or clearing brush and the laying brush are driven in their appropriate directions by a single short belt from the individual transmission pulley of each section, the belts, brush shafts and pulleys being correspondingly lettered in each section. By thus using a single relatively short belt for driving all the brushes of each section it is possible to avoid stretching and undue wear of the belts that would result from the usual belting arrangement beside using a relatively narrow belt and pulley transmission, thus avoiding undue extension of the ends of the brush shafts which, with this arrangement, can all be disposed in the same plane.

Another set of transmission pulleys $a^3$, $b^3$, $c^3$, $d^3$ and $e^3$ are also mounted on the respective drive shafts of each section in offset relation to the transmission pulleys like $a^2$ which drive the brush shafts, and around the periphery of this second series of transmission pulleys $a^3$ etc., are carried transmission belt $a^{30}$, $b^{30}$, $c^{30}$, $d^{30}$ and $e^{30}$ which, passing over suitable guide pulleys are carried around the pulleys $a^5$, $b^5$ etc., secured to the ends of the fly blade shafts $a^4$, $b^4$, $c^4$, $d^4$ and $e^4$ to rotate the fly blades or rotary shears at the required speed. The fly blade driving belts, therefore, can be arranged to get the maximum friction upon the driving and the transmission pulleys and, being relatively short, are not subject to undue stretch or wear.

The cloth enters at the front end of the machine in front of where the operator stands to control the operation of the machine, and after passing over suitable idler tensioning rolls, is carried over a feed roll $f$ arranged at the top of each section some distance in front of the respective cloth rests $e^9$, $d^9$ etc., so as to travel in a substantially horizontal plane at the top of the machine where these advancing stretches of cloth, in front of each shear blade, are exposed to the view of the operator. While such an arrangement is satisfactory, so far as the first two or three shear sections are concerned, nevertheless the rearward shear sections are so far back from the operator as to make it difficult to inspect the rearward stretches of cloth in front of the back fly blades. To remedy this difficulty I have made the rearmost frame $a$ with the shear blade and cloth rest considerably higher than the top feed roll $f$ so that the cloth, traveling from the feed roll $f$ to the edge of the cloth rest $a^9$, travels up a fairly steep incline instead of on the horizontal. In the same way the next to the last section has its shear blade shaft $b^4$ and its cloth rest $b^9$ mounted at a relatively elevated position to produce a similar inclination although not as steep a one as for the last section. This principle of arrangement may be applied to any desired extent in order to prevent intermediate parts of the multiple shear from obstructing the view of the rearmost stretches of cloth in front of the respective rearward shears. This arrangement has become a serious objection as heretofore urged against the use of shearing elements in a single frame, and does not in the least interfere with the coupling on in front of as many shear sections as may be desired.

With four or five fly blades assembled in one machine the difficulties of the operator in adjusting the fly blade stops so that the different fly blades, when in operation, will be set or positioned at the appropriate distances from their respective cloth rests to shear the nap to the appropriate length, are manifestly greatly increased since, if the operator has to closely examine each fly blade in order to set it, much time is lost in going from one to another and making the appropriate adjustments.

To overcome this difficulty I have provided a series of manually controlled devices for setting or adjusting the different stop members for each fly blade frame or head so that the operator, from his position at the front of the machine, can not only set each individual fly blade stop to any desired position, but can tell, by means of a coordinated dial visible to him from the front of the machine, exactly what adjustment or setting he is obtaining through the stop-adjusting means.

Such adjusting means comprises a series of adjusting rods or shafts $a^{10}$, $b^{10}$, $c^{10}$, $d^{10}$, $e^{10}$, one for each stop running from the front end of the machine to each individual section and being operatively connected in each case with an individual rock-shaft carrying stop cams for limiting the swinging or pivotal movement of each fly blade toward its opposed cloth rests. Since the mechanism for setting all the stops of the different fly blades are the same, except as to the length of the hand-operated shaft, a description of one will suffice for all. I will, therefore, describe the construction and operation of the fly blade adjustment for the forward or front section of the machine, having particular reference to Figures 2, 3 and 4 as well as to Figure 1.

The horizontal hand-controlled shaft $e^{10}$ carries, at its front end, a suitable handle or grip and extends horizontally above and along one side of the machine toward the rear, being supported in suitable bearing brackets mounted on standards 19 and $e^{19}$ carried by the side of the main frame and projecting upwardly therefrom.

At its rearward end this hand-controlled shaft $e^{10}$ is provided with a bevelled gear $e^{11}$ intermeshing with a horizontal bevelled gear $e^{12}$ secured to the vertical shaft $e^{17}$ which is mounted in a suitable housing $e^{16}$ carried by the standard $e^{19}$ and affording adjacent bearings for the horizontal shaft $e^{10}$ and the vertical shaft $e^{17}$.

On the top of the shaft $e^{17}$ is firmly secured a graduated dial $e^{14}$ bearing appropriate scale numerals and cooperating with a fixed pointer $e^{15}$ which projects upward from the housing $e^{16}$ in front of the dial. At its lower end the shaft $e^{17}$ carries a worm $e^{22}$ meshing with worm gear $e^{23}$ secured to the end of the transverse shaft $e^{24}$ extending across the top portion of the machine. The worm and gear connection between the vertical shaft and the transverse cam shaft $e^{24}$ prevents any backlash so that the dial $e^{14}$, at the top of the worm shaft, will always register precisely the rotative position of the cam or stop shaft $e^{24}$.

Figures 2, 3, 4:
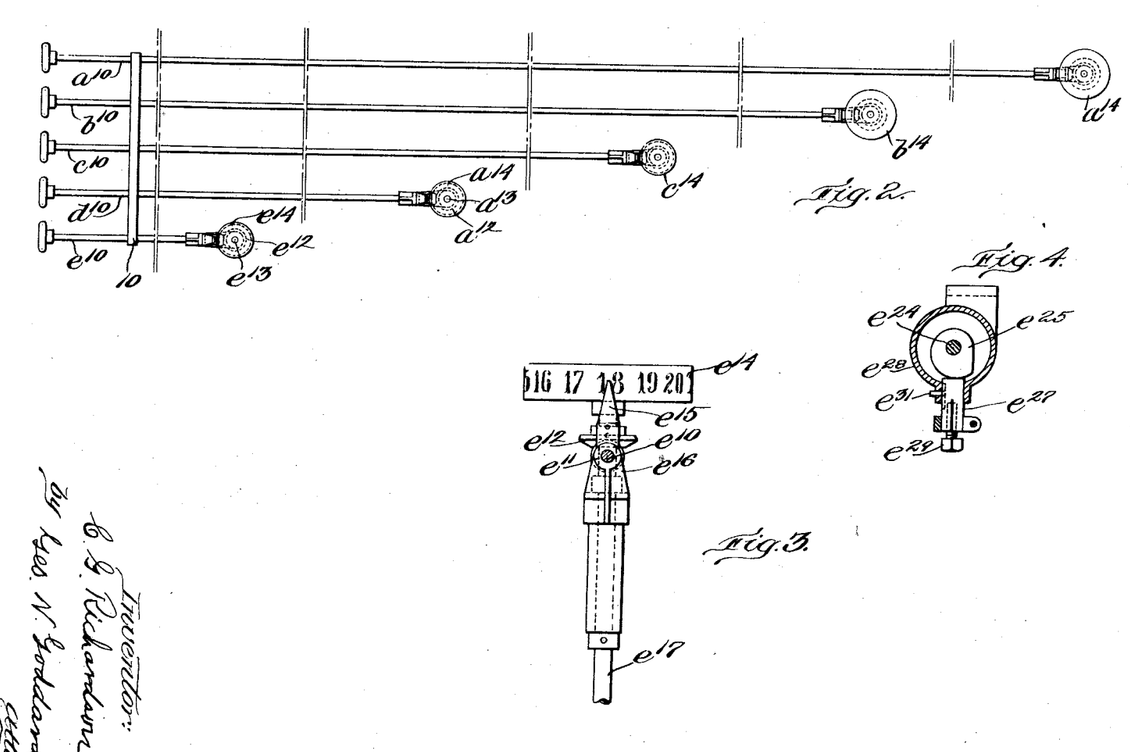
Figure 2 is a plan view illustrating the arrangement of the fly-blade frame stop-adjusting mechanism with their respective dials.
Figure 3 is an enlarged front elevation showing one of the dials as it will appear to the operator at the front of the machine.
Figure 4 is a sectional detail showing the adjustable stop raised for limiting the approach of each shear blade to its cloth rest.

As shown in Figure 4, there is secured, at each end of the transverse shaft $e^{24}$, an eccentric cam $e^{25}$ located within an encircling casing $e^{28}$. In the bottom of this casing there is mounted a vertical plunger or slide-rod $e^{27}$ which is kept from dropping out of the casing by any suitable contrivance, such as a stop screw $e^{31}$, projecting into an elongated slot or groove formed in the side of the plunger. In the bottom of the plunger is inserted an adjustable screw or bolt $e^{29}$ forming an abutment against which the rearward extension or arm $e^{60}$ of the fly blade frame $e^6$, which is fulcrumed on the rock-shaft or trunnions $e^7$, abuts when the fly blade is allowed, by gravity, to return to operative position for shearing adjacent to the cloth rest $e^9$.

When the stop abutment $e^{29}$ on the plunger $e^{27}$ is held at a relatively low position it will prevent the fly blade frame $e^6$ from swinging close to the cloth rest. The rotative position of the eccentric cams $e^{25}$ determines just how far these stop members are varied upwardly under the pressure of the arms $e^{60}$ of the fly blade frame, before arresting the motion of the latter. Consequently, as the operator can set or adjust, through the mechanism already described, the rotative position of the stop cams $e^{25}$, he is able to control, by very fine gradations the precise stop position or limit of approach of the fly blade to the cloth rest, and as the dial $e^{14}$ shows with precision just what adjustment is effected it is easy for the operator to set and to adjust each individual stop for each individual fly blade frame so as to get just the proper length of shearing for the successive fly blades. The backlash between the bevel gears $e^{11}$ and $e^{12}$ is of no consequence because the dial is attached to the worm shaft whose operative connection with the transverse cam shaft or stop shaft is free from backlash. Hence, it will be seen that the operator can set, with exact precision, each individual fly blade without leaving his position at the front of the machine.

The mechanical labor of lifting the heavy fly blades, which are arranged to normally swing toward their respective cloth rests under the action of gravity, is quite burdensome where so many blade-shifting operations are required at each circuit of the cloth. I have therefore provided a power mechanism, manually controlled by the operator, to assist him in performing or to perform under his control the work of lifting the respective fly blades as the cloth seam approaches the line of shearing in order to let the seam pass between without injury to the cloth, and this mechanism is most clearly shown in Figure 5.

Figure 5:
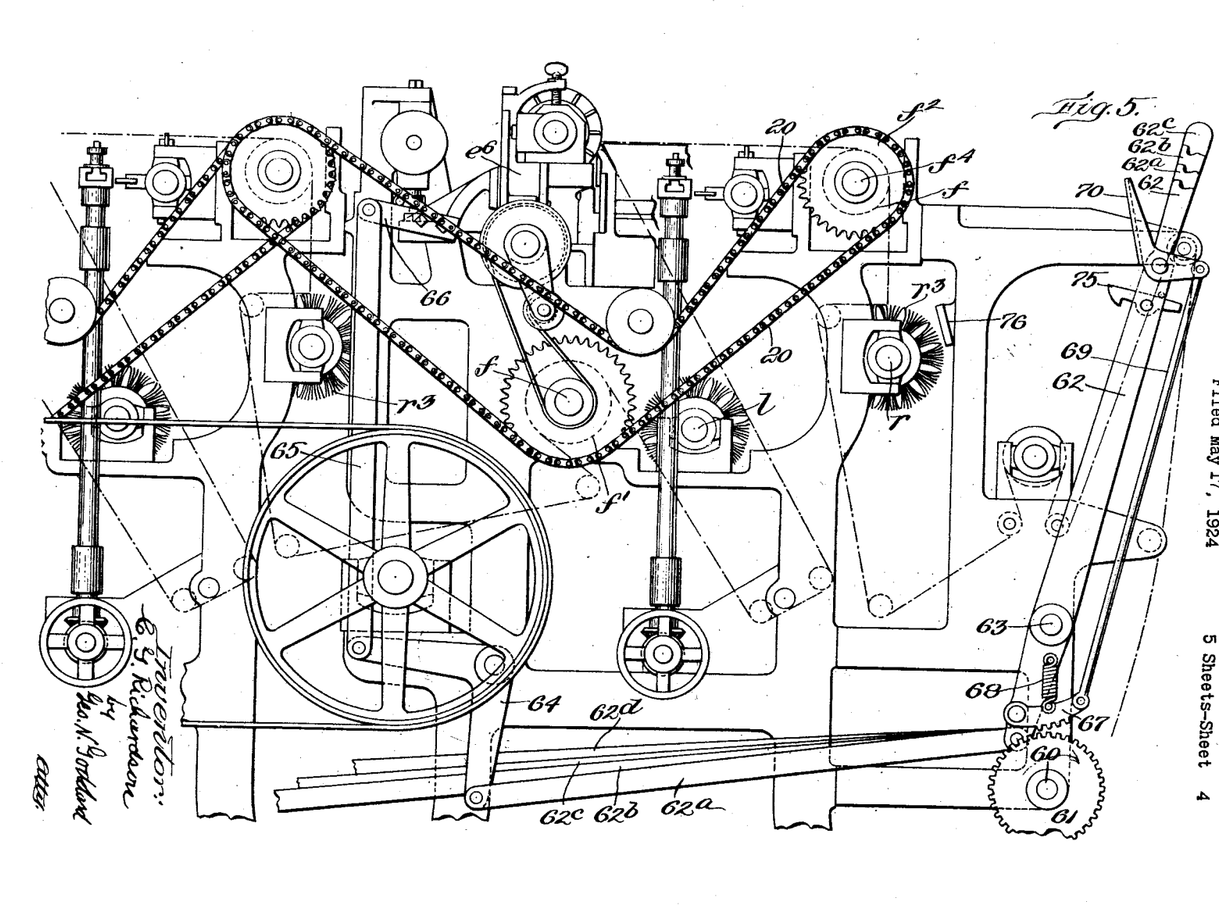
Figure 5 is an elevation of the left-hand side of the machine at the front end showing the chain drive connection for the feed rolls and also illustrating the manually controlled power mechanism for raising the respective fly blades.

Referring now to Figure 5, there will be seen at the bottom right hand corner of the figure a transverse shaft 60, which is continuously rotated and to which is secured a spur gear 61 which rotates continuously. A hand lever 62 is pivoted at 63, and at its lower end is pivotally connected with a link 62ª, whose rearward end is connected to one arm of a bell crank lever 64. A vertical link 65 is pivotally connected to the other arm of the bell crank lever 64, and at its upper end is pivotally connected with an arm 66 projecting from fly blade $e^6$. It will be understood that as the operator, standing at the front of the machine, that is, the right in Figure 5, throws the hand lever 62 toward the rear of the machine, the lower end of the lever 62, through the link connections, operates to swing the fly blade upward away from the cloth rest. To perform this operation by power I mount, near the bottom of lever 62, a pivoted latch 67 which is preferably kept raised by a tension spring 68, and whose free end is connected with a lifting rod 69 attached to a rock lever 70, pivoted at the handle or upper end of the lever 62. If the upwardly projecting member of the rock lever 70 is grasped and drawn toward the handle it will tend to move the latch 67 against the tension of the spring into engagement with the teeth of the spur gear 61. When so engaged the continuously rotating gear 61 acts to swing the rear end of the lever 62 forward and the top end to the rear, thus raising the fly blade from the cloth rest.

The arrangement is such that further forward movement of the lower end of the lever 62, carrying the latch 67, causes the latch to be disengaged from the spur gear automatically. Otherwise, the mere releasing of the rock-lever 70 allows the retractile spring 68 to function to disengage the latch from the rotating gear.

As will be understood, this lever and latch mechanism is exactly duplicated for each individual shear, the only difference in construction being that the conecting links 62ᵇ, 62ᶜ, 62ᵈ, and 62ᵉ, are made of different lengths so as to connect with the appropriate connections for each individual fly blade. The duplication of this mechanism is conveniently illustrated in Figure 5 by successively breaking away the upper ends of the different duplicated levers 62ª, 62ᵇ, 62ᶜ, to show one behind the other.

It will thus be seen that the raising of each individual fly blade is kept entirely under the control of the operator, while at the same time he is relieved of the physical labor by merely latching any desired controlling lever to its actuating gear 61.

Each lever may also be provided with a hook latch 75 to latch over a transverse bar or stop 76 when it is desired to have the fly blade held in raised position as, for example, when the cloth is first being drawn through the machine.

It will be understood that in each case, according to the usual practice, the ledger blade $e^8$, forming the stationary member of each shearing couple, is secured to the fly blade head or frame $e^6$ so that it swings toward and away from the cloth rest in unison with the rotary fly blade.

Figures 6, 7:
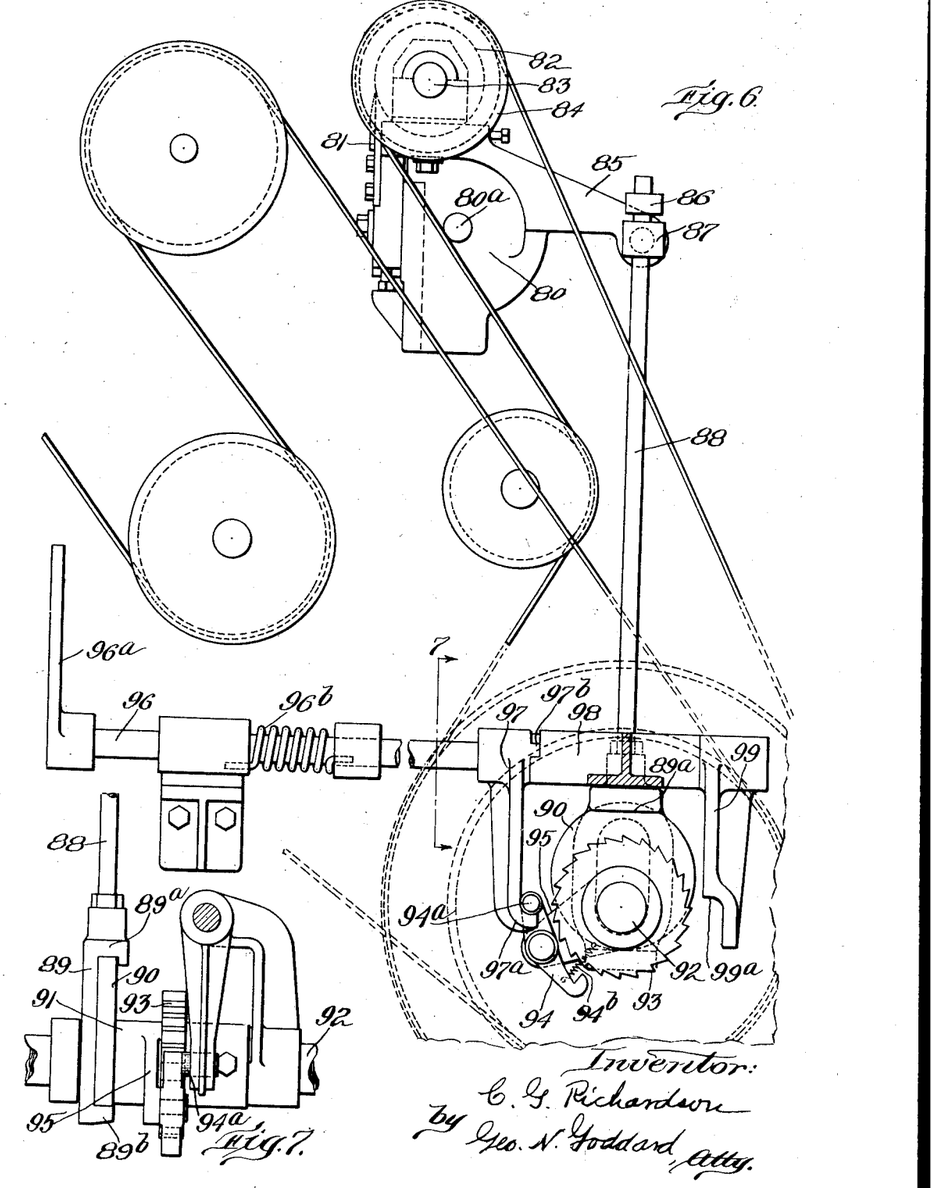
Figure 6 is a side elevation at the front end of the machine illustrating a modified form of power-actuated mechanism for raising a shear blade.
Figure 7 is a detail front elevation of a part of said power mechanism shown in Figure 6.

In Figures 6 and 7 I have shown a modified blade raising power mechanism which may be used in place of that previously described.

In Figure 6 I have shown, in side elevation, the pivotal fly blade head 80 mounted on trunnions 80ª with the ledger blade 81 attached in cooperative relationship to the rotary fly blade 82, carried by the shaft 83 on which is secured the driving pulley 84, all as above described.

On the rearward extension or arm 85 of the fly blade frame is mounted a swiveled stud 87, vertically bored to receive the actuating or lifting rod 88 which is slidable in the swivel 87, and is provided with a head or nut 86 arranged to provide a slight lost motion or clearance before the head 86 exerts an operative thrust on the top of the swivel 87 when the rod 88 is pulled downward.

The actuating rod is drawn down and raised alternately by an eccentric cam 90 on a sleeve 91 which cam is located between two ledges or abutments 89$^a$ and 89$^b$ formed on a cross head 89 to which the lower end of the rod 88 is secured.

The intermittently rotatable sleeve 91, which carries the cam 90, is mounted on a constantly rotating shaft 92 to which is secured a ratchet wheel 93 which rotates continuously with said shaft.

The pawl 94 is normally drawn into interlocked engagement with the ratchet wheel 93 by means of a tension spring 94$^b$, and at its opposite end is provided with a laterally projecting offset or stud 94$^a$ which, when engaged by the controlling members, presently to be described, serves to release the pawl 94 from engagement with the ratchet wheel.

Adjacent to and above the ratchet wheel 93 is mounted a rock-shaft 96 at right angles to the axis of the shaft 92 which rock-shaft is normally turned in a clockwise direction, as viewed from in front, that is, in front of the hand lever 96$^a$, the limit of rotation being effected by a shoulder on the bearing box 98 which is engaged by a shoulder 97$^b$ on the hub of the arm 97 which is secured to the rock-shaft 96. At its lower end the rock arm 97 is provided with a hook 97$^a$ adapted to engage the offset pin or stud 94$^a$ on the pawl when the arm 97 is in vertical position. Counter-clockwise rotation of the rock-shaft 96, by means of the hand lever 96$^a$, acts to swing the hook 97$^a$ out of engagement with the pawl, thereby allowing the spring 94$^b$ to engage the pawl interlockingly with the ratchet wheel 93. As the pawl is mounted on an arm 95, projecting from the cam sleeve 91, it is obvious that as soon as the pawl is interlocked with the ratchet the sleeve 91 will partake of the rotative movement of the ratchet wheel so that the swell or high part of the cam will rotate from the uppermost abutment 89$^a$ into engagement with the lower abutment 89$^b$ of the cross head 89, thereby acting to pull down the rod 88 and thus raise the fly blade.

On the rear end of the rock-shaft 96 is secured another arm 99, provided with a shoulder 99$^a$, arranged to be engaged by the offset pin 94$^a$ as the pawl rotates through half a revolution. This shoulder acts to knock off or disengage the pawl from the ratchet so that the blade remains lifted until the hand lever 96$^a$ is thrown over again to swing the arm 99 clear from engagement with the pin 94$^a$. The re-engagement of the pawl with the ratchet causes the cam 90 to rotate through another half revolution, that is, until the stud 94$^a$ once more engages the hook 97$^a$, when the cam sleeve again ceases to rotate until the rock-shaft 96 is again turned by the operator.

It will be seen that by this arrangement the fly blade is lifted by power but that its action is manually controlled and in this form of the device the lowering of the device as well as the raising of it is effected by the cam which acts to produce a gradual descent without shock or rebound.

What I claim is:

1. In a multiple cloth shearing machine, the combination of a plurality of fly blades mounted at intervals across the top of the machine, cloth-feeding and supporting means arranged in front of each fly blade to support the cloth with its nap exposed for some distance as it approaches the respective fly blades, the cloth-supporting means in front of the forward fly blades being disposed to cause the cloth to travel toward the fly blade in substantially horizontal planes, the rear-most fly blades being mounted above the level of the forward ones and the cloth-supporting means in front of such elevated fly blades being disposed to cause the parts of the cloth approaching such fly blades to travel obliquely upward to the line of shearing, substantially as described.

2. In a multiple cloth shearing machine, the combination of a series of transverse cloth rests, coordinated fly-blades movable toward and from said rests, a series of adjustable stop members arranged to support the thrust of the respective fly-blades toward their cloth rests when the fly-blades are in shearing position, vertical shafts operatively connected with the stop members to adjust them to different positions, indicator dials connected to the top of the respective vertical shafts to indicate the adjusted positions of said stop members and their fly-blades, and means controlled by the operator at the front of the machine for adjusting the individual stop members and their dials, substantially as described.

3. In a multiple cloth shearing machine, the combination of a series of cloth rests and coordinated fly-blades mounted in adjustable relationship, adjusting means for determining the relative positions of each fly blade and cloth rest in order to regulate the length of nap being sheared, said adjusting means embracing a series of vertical dial shafts and adjustable stop members connected thereto by worm and gear connections preventing backlash between the stop and the dial, and means controlled by the operator at the front of the machine for rotating each individual dial shaft, substantially as described.

4. In a cloth shearing machine, the combination with a cloth rest, of a rotary fly blade mounted in a movable head and normally supported in cloth-shearing relation to said cloth rest, a continuously rotating driving element, and manually controlled means for establishing an operative connection between said driving element and said fly blade head to cause the fly blade to move away from the cloth rest, substantially as described.

5. In a cloth shearing machine, the combination with a cloth rest, of a fly blade rotatably mounted in a pivoted head to permit movement of the fly-blade to and from the cloth rest, a power driven actuating member, means for manually establishing operative connection between said actuating member and the fly blade head to raise the blade from the cloth rest, said manual means including a fly-blade shifting lever controllable at all times by the operator, substantially as described.

6. In a cloth shearing machine, the combination with a cloth rest, a rotary fly-blade supported in a pivoted head, a hand lever interconnected with the fly-blade head to shift said head, a lever-actuating element normally disconnected from said lever, and means controllable by the operator for operatively connecting the lever-actuating element with the lever to relieve the operator from lifting the fly-blade, and means for automatically releasing said operative connection after a predetermined movement of the lever-actuating element substantially as described.

7. In a cloth shearing machine, the combination of a fly blade rotatably mounted in a movable supporting head, a blade-raising hand lever operatively interconnected with the fly blade head, a rotary power driven gear mounted in proximity to said lever, a latch mounted on the lever and normally disconnected from said gear and means arranged adjacent to the handle of said lever to connect said latch with the gear so as to cause the latter to actuate the blade-raising lever, substantially as described.

8. In a shearing machine, the combination of a series of rotary fly blades mounted in separately movable supports one behind the other transversely of the machine, a series of blade-raising levers mounted side by side at the front of the machine, said levers having operative connection with corresponding fly-blade heads by connecting links of different length, a plurality of continuously rotating actuating elements arranged to cooperate with the respective levers to raise the corresponding fly blades, and manually controlled means on each lever for operatively connecting any lever at will with its actuating element, substantially as described.

In witness whereof, I have subscribed the above specification.

CHARLES G. RICHARDSON.